(12) United States Patent
Boyd et al.

(10) Patent No.: US 7,412,577 B2
(45) Date of Patent: Aug. 12, 2008

(54) SHARED DATA MIRRORING APPARATUS, METHOD, AND SYSTEM

(75) Inventors: Kenneth Wayne Boyd, Tucson, AZ (US); Kenneth Fairclough Day, III, Tucson, AZ (US); Philip Matthew Doatmas, Tucson, AZ (US); John Jay Wolfgang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 10/772,875

(22) Filed: Feb. 5, 2004

(65) Prior Publication Data

US 2005/0177692 A1    Aug. 11, 2005

(51) Int. Cl.
*G06F 12/04* (2006.01)

(52) U.S. Cl. .................. 711/162; 711/161
(58) Field of Classification Search ........... 711/161, 711/162, 112, 170, 202, 203; 714/20, 6, 714/18, 710, 748, 764
See application file for complete search history.

(56) References Cited

U.S. PATENT DOCUMENTS

| 5,546,536 | A * | 8/1996 | Davis et al. .............. 711/162 |
|---|---|---|---|
| 6,088,697 | A | 7/2000 | Crockett et al. ........... 707/10 |
| 6,128,699 | A * | 10/2000 | Golding ................. 711/112 |
| 6,175,900 | B1 | 1/2001 | Forin et al. ............. 711/156 |
| 6,366,986 | B1 | 4/2002 | St. Pierre et al. ......... 711/162 |
| 6,397,229 | B1 | 5/2002 | Menon et al. ............ 707/204 |
| 6,460,054 | B1 | 10/2002 | Grummon ............... 707/204 |
| 6,549,992 | B1 | 4/2003 | Armangau et al. ........ 711/162 |
| 6,684,294 | B1 * | 1/2004 | Huffman ............... 711/112 |
| 6,938,135 | B1 * | 8/2005 | Kekre et al. ............ 711/162 |
| 7,051,173 | B2 * | 5/2006 | Tsuchiya et al. ......... 711/162 |
| 2002/0059505 | A1 | 5/2002 | St. Pierre et al. ......... 711/162 |
| 2002/0133512 | A1 | 9/2002 | Milillo et al. ............ 707/204 |
| 2003/0005235 | A1 | 1/2003 | Young ................. 711/141 |
| 2003/0065901 | A1 | 4/2003 | Krishnamurthy ......... 711/170 |
| 2003/0088592 | A1 | 5/2003 | Innan et al. ............ 707/204 |
| 2003/0088713 | A1 | 5/2003 | Mandal et al. .......... 709/328 |

OTHER PUBLICATIONS

"LAN- Free Backups Using the Sun StorEdge Instant Image 3.0 Software", http://www.sun.com/blueprints Jun. 2002, part No. 816-4527-10 Revision A, May 10, 2002.
"Sun StorEdge Instant Image 3.0 Configuration Guide", Part No. 806-7676-10, Jun. 2001, Revision A.

* cited by examiner

*Primary Examiner*—Pierre-Michel Bataille
(74) *Attorney, Agent, or Firm*—Kunzler & McKenzie

(57) ABSTRACT

A network component useful in tracking write activity by writing logs containing write address information is described. The tracking component may be used in networked systems employing data mirrors to record data block addresses written to a primary storage volume during the time a data mirror is unavailable. The tracking component can be available to any network originating node, and may therefore track write activity on multiple volumes. At the time a data mirror is reconstructed, the log written may be used to construct a list of block addresses pointing to locations on a primary storage volume wherein data differs from a secondary storage volume member of the mirror. The locations maybe copied from the primary to secondary storage volume to reconstruct the data mirror. The performance impact of the tracking component is minimal and a shared network resource is offered that increases fault tolerance in the event of backup device failures.

4 Claims, 4 Drawing Sheets

SHARED DATA MIRRORING APPARATUS, METHOD, AND SYSTEM

BACKGROUND OF THE INVENTION

1. Field of the Invention

The present invention relates to improving fault tolerance of a storage network. Specifically, the invention relates to apparatus, methods, and systems for mirroring data on a storage network in a shared manner.

2. Relevant Art

Data processing systems often maintain duplicate storage volumes, or data stores. A copy of a source volume (i.e. a target volume) containing the same data as the source volume is commonly referred to as a data mirror. Data mirrors are often created when on-line access to data is critical. If data from the primary volume is unavailable due to failure of a system component, data from the associated secondary volume is available.

To create and maintain a data mirror, data from a primary volume is often copied to one or more secondary volumes. In like fashion, updates to the primary volume are propagated to the secondary volume such that the secondary volume has the same data as the primary volume. Coherency is a term used to indicate the degree that data on a secondary volume is an exact copy of the data on a primary volume.

Synchronous mirroring techniques achieve a high level of coherency by directing each write operation to both a primary and a secondary volume. Synchronously mirrored systems often halt data processing after a write to a primary volume until an acknowledgment has been received that the associated write operation has also been performed on the corresponding secondary volume in a data mirror. Consequently, synchronous mirroring techniques may significantly degrade system performance, particularly when the secondary volume is remotely located and operations are transmitted over a communication line. Moreover, failure of a secondary volume or interruption of communication facilities may bring the processing system to a halt.

In an effort to improve performance in mirrored systems, techniques have been devised to provide "virtual coherency." The term "virtual coherency" is related to the fact that although a secondary volume differs from a primary volume at a point in time, all necessary data to generate an exact copy on the secondary volume is available in various data repositories on the system. Incremental backup systems in which a primary volume is replicated on a secondary volume and then updated periodically with changes are examples of virtual coherency.

Systems that utilize virtual coherency to improve performance are vulnerable to failure of the repositories that store information necessary to reconstruct a data mirror. In the event of such failure, a typical method of recovery is to replicate the primary volume on the secondary volume and subsequently perform synchronous mirroring. This method interrupts the system's ability to provide access to data during the replication operation and severely impacts performance during the operating duration using synchronous mirroring.

What is needed are apparatus, methods, and systems that minimize performance degradation and improve fault tolerance during periods of component failure while achieving an acceptable level of coherency between primary and secondary volumes in a data mirror. Such apparatus, methods, and systems would provide constant access to data and maintain high levels of data integrity.

SUMMARY OF THE INVENTION

The present invention has been developed in response to the present state of the art, and in particular, in response to the problems and needs in the art that have not yet been fully solved by currently available storage networks. Accordingly, the present invention has been developed to provide an apparatus, method, and system for shared data mirroring that overcomes many or all of the above-discussed shortcomings in the art.

One technique to improve the performance of data mirroring operations detailed in co-pending application Ser. No. 10/339,957 filed Jan. 9, 2003 incorporated herein by reference involves the use of a dedicated backup component attached to a storage network. The backup component manages all aspects of replication, including network management if the secondary volumes are remote. Since the backup component may be highly redundant and contain buffers and non-volatile memory for temporary storage of data, a network host is required to wait only for acknowledgement that the backup component received a write data command before continuing to execute a process, rather than waiting for acknowledgement that the data was successfully written on a secondary storage device. This technique removes the delay caused by communication of the data to a remotely located member of the data mirror and the delay incurred while writing data to the secondary volume. Thus virtual coherency is achieved with little impact to system performance.

The backup component is available to all hosts on the storage network and is therefore an efficient way to maintain an off-site backup of the network data. A system including a backup component may utilize forked write commands. A forked write command is composed of multiple sub-commands constructed to write to a backup component, and subsequently to write data to a primary volume after the backup component has responded with command complete status.

While this technique may achieve better performance than synchronous data mirroring, failure of the backup component or transmission link associated therewith may bring the system to a halt. In order to permit continued system operation in the event of backup component failure, there is a need to record information necessary to update and synchronize the data mirror when the backup component is once again available.

In one aspect of the present invention, an apparatus for logging block addresses, referred to herein as a tracking component, attaches to a network and receives write commands such as forked write commands from one or more hosts. In one embodiment, the tracking component includes a response module that accepts a tracking command, an extraction module that extracts block address information from the tracking command, and a log module that maintains a log containing the block address information, referred to herein as a tracking log. In one embodiment the block address information includes metadata. In a certain embodiment, the tracking component is used while a backup component is inoperable in order to log addresses of blocks that have not been mirrored on a secondary volume.

In certain embodiments, the tracking log records date and time information along with address information. In some embodiments, the tracking log is structured as one or more bitmaps. Each volume is mapped to a specific bitmap and block addresses are mapped to bits within the bitmap. In certain embodiments, the tracking component transfers information contained in tracking logs to the network. The information may be used to identify blocks of data on a primary volume that were changed during a period of backup component failure, and therefore need to be replicated on a secondary volume. In another embodiment, the tracking component administers data mirror reconstruction by managing the replication of changed blocks from the primary volume to the secondary volume using information contained in the tracking logs.

All hosts on a network may use the same tracking component, alleviating the need for each host or each storage controller on the network to track blocks written to a primary volume during the period when a backup component is not available. The tracking log also simplifies reconstruction of a data mirror since the addresses of blocks written to all primary volumes are recorded therein, regardless of originating node. Without availability of the tracking log, a process would need to read changed block address logs recorded on multiple nodes and multiple storage controllers and then subsequently merge the address logs into a set of address block lists required to update one or more secondary volumes.

In another aspect of the present invention, a method for logging block address information includes extracting block address information contained in tracking commands, recording changed block address information in a tracking log, and transferring information from the tracking log to the network. In certain embodiments, the information from the tracking log is transferred to the network in conjunction with the reconstruction of a data mirror. In another aspect of the present invention, a system for shared data mirroring within a network shares one or more backup components and one or more tracking components. In one embodiment, the tracking component is configured to extract and record block address information. In certain embodiments, the tracking component provides information necessary to reconstruct a data mirror.

With very little system performance impact, the tracking component tracks information necessary to reconstruct a data mirror. The present invention provides a highly available system with the advantages of efficiency, consistency, high performance, and fault tolerance. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 1 through 5, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 1:
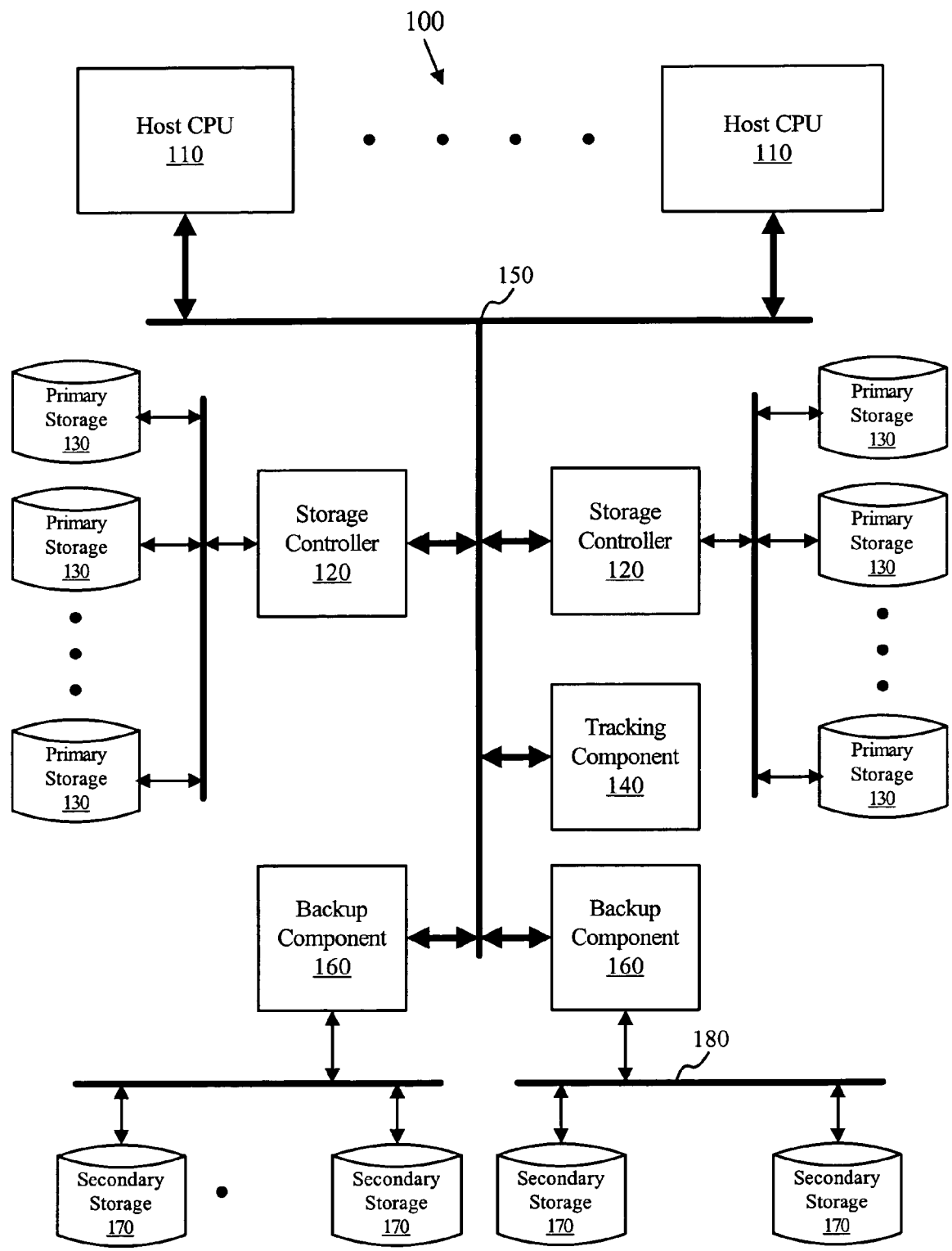
FIG. 1 is a block diagram illustrating a networked system incorporating a tracking component apparatus of the present invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment and the described features, structures, or characteristics may be combined in any suitable manner in one or more embodiments FIG. 1 is a block diagram illustrating a networked system 100. The depicted embodiment includes one or more host CPUs 110, one or more storage controllers 120, one or more primary storage volumes 130 connected to each storage controller 120, a tracking component 140, a network communication path 150, one or more backup components 160, one or more secondary storage volumes 170, and a communication path 180. The primary storage volumes 130, and the secondary storage volumes 170 are organized as data mirrors wherein the data on a primary storage volume 130 is either replicated on a secondary storage volume 170, or there is information residing within network components to update a secondary storage volume 170 to be congruent with a primary storage volume 130. The network organization allows the host CPUs 110 to share access to primary volumes and simplifies backup operations.

As exemplified in FIG. 1, the networked system 100 may include multiple host CPUs 110, each of which may be executing multiple process threads. The host CPUs 110 use the network communication path 150 to communicate with one or more storage controllers 120 that provide access to shared primary storage volumes 130. The primary storage volumes 130 may be individual storage devices or may be redundantly organized arrays of storage devices to provide increased performance or reliability.

One or more backup components 160 provide a gateway to the secondary storage volumes 170 and may perform all necessary actions to access the secondary storage volumes 170 using the communication path 180. The tracking component 140 is active during the period when the backup component 160 is unable to successfully execute a write command. Backup component failure may be caused by failure of the communication path 180, failure of one or more storage devices used by the backup component 160 to temporarily store data directed to a secondary storage volume 170, failure of a processor or memory in the backup component 160, failure of a secondary storage volume 170, or the like.

The tracking component 140 accepts a tracking command and extracts block address information. The tracking component 140 also provides completion status using the network communication path 150, and maintains a tracking log containing the block address information. The tracking log is subsequently used to identify data blocks on a primary storage volume 130 that are required to be replicated to a secondary storage volume 170 when the backup component 160 is once again operational. In some embodiments, the tracking component 140 may be used to provide tracking logs during normal operation.

Figure 2:
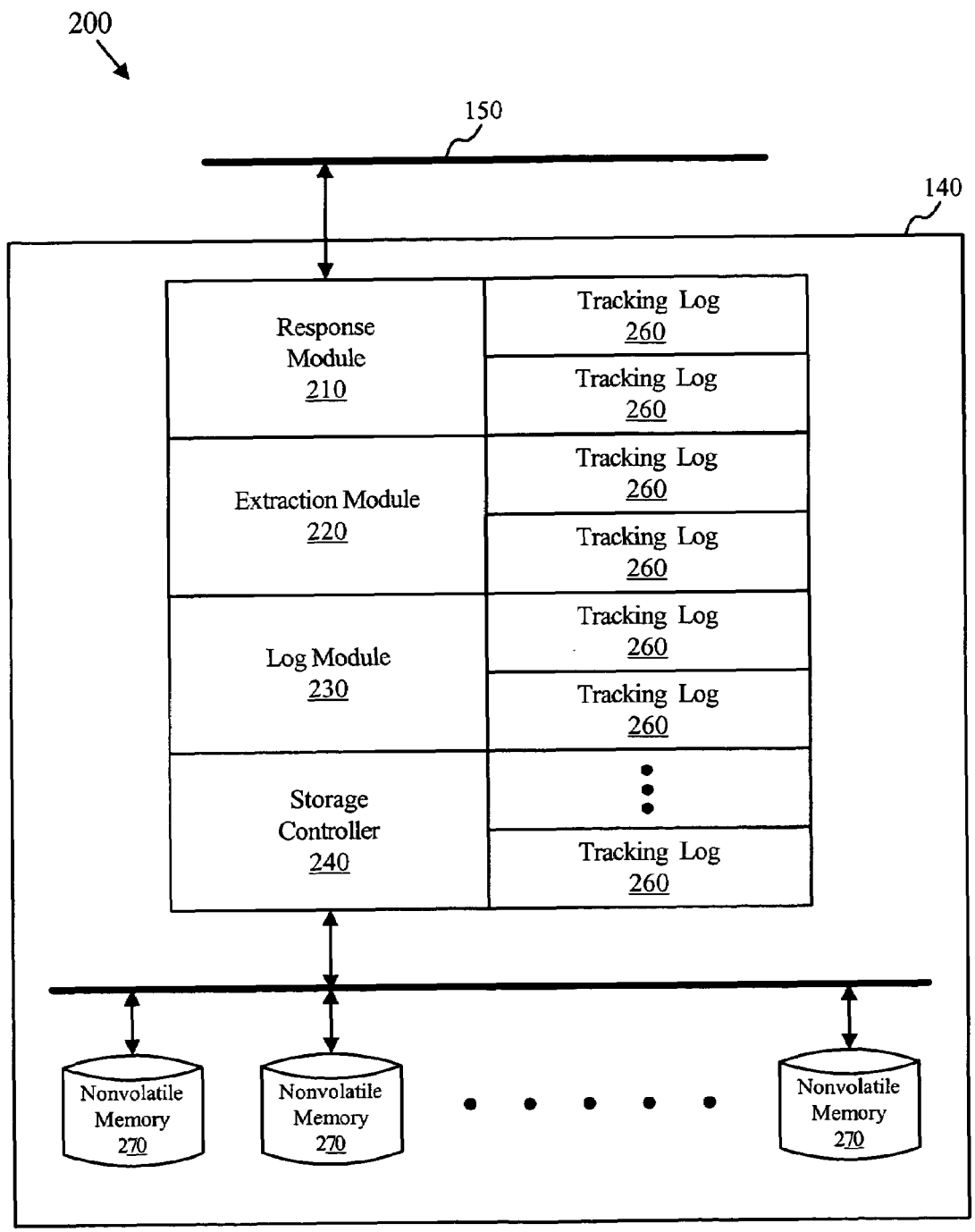
FIG. 2 is a block diagram illustrating a configuration of a tracking component apparatus of the present invention.

FIG. 2 is a block diagram illustrating one embodiment of a tracking component 200. The depicted embodiment of the tracking component 200 is given as one example of a manner of implementing the tracking component 140 depicted in FIG. 1. The depicted embodiment includes a response module 210, an extraction module 220, a log module 230, a storage controller 240, the network communication path 150 shown in FIG. 1, tracking logs 260, one or more nonvolatile memories 270, and a tracking component 140. The tracking component 140 logs address information of blocks presented in a tracking command, and subsequently provides the tracking log information to the network communication path 150 for use in reconstructing a data mirror or the like.

The response module 210 accepts a tracking command presented on the network communication path 150. The extraction module 220 extracts address information from the tracking command. The log module 230 records the address information by writing to one of the tracking logs 260. The tracking logs 260 are subsequently transferred to the local storage controller 240 and written to non-volatile memory 270. In certain embodiments, the tracking log is organized as a bitmap representing block allocations on one or more volumes. In some embodiments the tracking log includes date and time information, metadata, and the like.

In certain embodiments the log module 230 reads a tracking log 260 and transfers the information contained therein to the network communication path 150. In some embodiments, the log module 230 provides information from a tracking log 260 to the response module 210, which in turn issues a read command to a primary storage volume 170 shown in FIG. 1, the read command specifying the address of data blocks identified by the tracking log 260. In one embodiment, the response module issues one or more write commands to a backup component 160 shown in FIG. 1, the write command containing data previously read from a primary storage volume 130 shown in FIG. 1.

Figure 3:
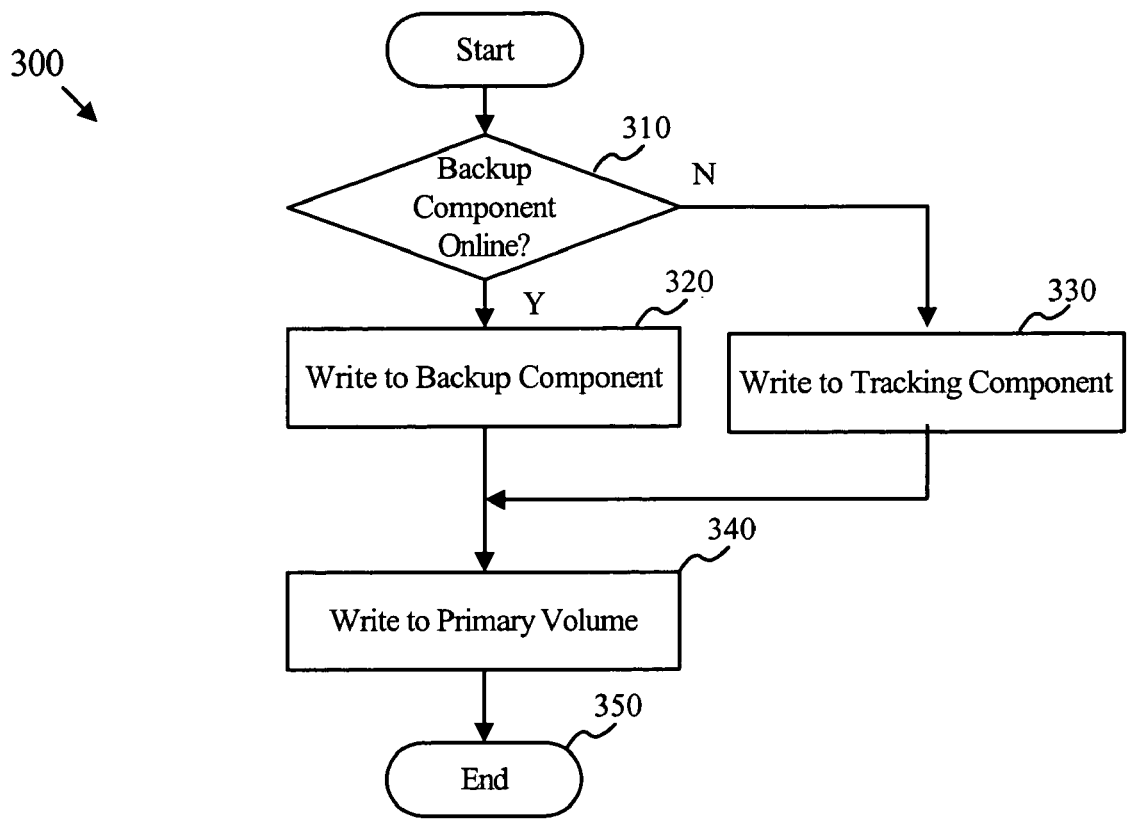
FIG. 3 is a flow chart diagram illustrating one embodiment of a forked write method of the present invention.

FIG. 3 is a flow chart diagram illustrating one embodiment of a forked write method 300 of the present invention. The depicted embodiment includes a backup component on-line test 310, a write to backup component step 320, a write to tracking component step 330, a write to primary volume step 340, and an end step 350. An advantage of the forked write method 300 is that the primary volume will not receive write operations unless actions are taken to provide provisional coherency.

In one embodiment, backup component on-line test 310 interrogates a data structure on an originating node such as a host that maintains status information regarding various components. If the data structure indicates that the backup component is on-line, the write to backup component step 320 issues a write command containing mirror data to a backup component similar to the backup component 160 shown in FIG. 1, or the like. The backup component accepts the write command, records the mirror data on intermediate storage and responds with command complete. Thereafter, the backup component may issue a write command to a secondary storage volume similar to the secondary storage volume 170 of FIG. 1 utilizing a local or remote communication path similar to communication path 180 of FIG. 1.

The mirror data is written to a secondary storage device such as the secondary storage device 170 of FIG. 1. If a failure is detected in the backup component, the communication path, or associated storage devices, the data structure on the originating node that maintains status on various components is updated to show the backup component to be offline.

If the data structure maintained on the originating node indicates that the backup component is not on-line, the write to tracking component step 330 issues a tracking command to a tracking component such as the tracking component 140 of FIG. 1, or the like. The tracking component accepts the tracking command, extracts address information relating to an upcoming write to a primary volume and responds with command complete. Thereafter, the tracking component writes the extracted information to a tracking log.

After successful execution of the write to backup component step 320 or the write to tracking component step 330, the forked write method 300 performs the write primary volume step 340 which issues a write command to a primary volume, conducted using a primary storage volume 130 of FIG. 1. After the write primary volume step 340 is complete, the forked write method 300 proceeds to the end step 350. Since the primary volume is written only if the write to the backup component or the write to the tracking component is successful, virtual coherency is maintained. The forked write method 300 can be utilized by all hosts in the storage network and provides fault tolerant data mirroring with minimal impact on system performance.

Figure 4:
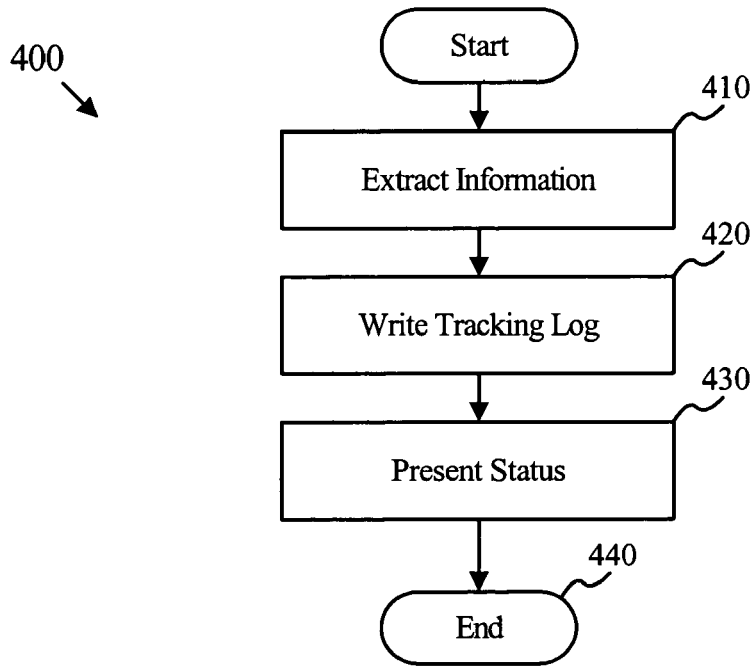
FIG. 4 is a flow chart diagram illustrating one embodiment of a write tracking log method of the present invention.

FIG. 4 is a flow chart diagram illustrating one embodiment of a write tracking log method 400 of the present invention. The depicted embodiment of the write tracking log method 400 includes an extract information step 410, a write tracking log step 420, a present status step 430, and an end step 440. The log module 230 of FIG. 2, or the like, may conduct the write tracking log method 400.

The write tracking log method may be performed by a shared tracking component attached to a network. For example the tracking component 140 of FIG. 1 may be used and, may include multiple hosts and multiple storage controllers. An advantage of the write tracking log method 400 is that the tracking log may include a record of all write activity on the network while a backup component is offline, and therefore may simplify regeneration of multiple data mirrors after the backup component returns to full functionality.

In one embodiment the write tracking method 400 performs the extract information step 410 by extracting block address information relating to an upcoming write to a primary volume from a tracking command presented to a tracking component such as the tracking component 140 of FIG. 1, during a period of time when a backup component is offline. The write tracking log step 420 writes the block address information to a tracking log, shown in FIG. 2, or the like.

In some embodiments, the tracking log is organized as a bitmap representing allocation units on various volumes. In certain embodiments, a time-stamp is written to the tracking log with the block address information. In another embodiment, metadata is written to the tracking log with the block address information. The present status step 430 presents command complete status to the network. Once the present status step is completed, the method ends 440.

Figure 5:
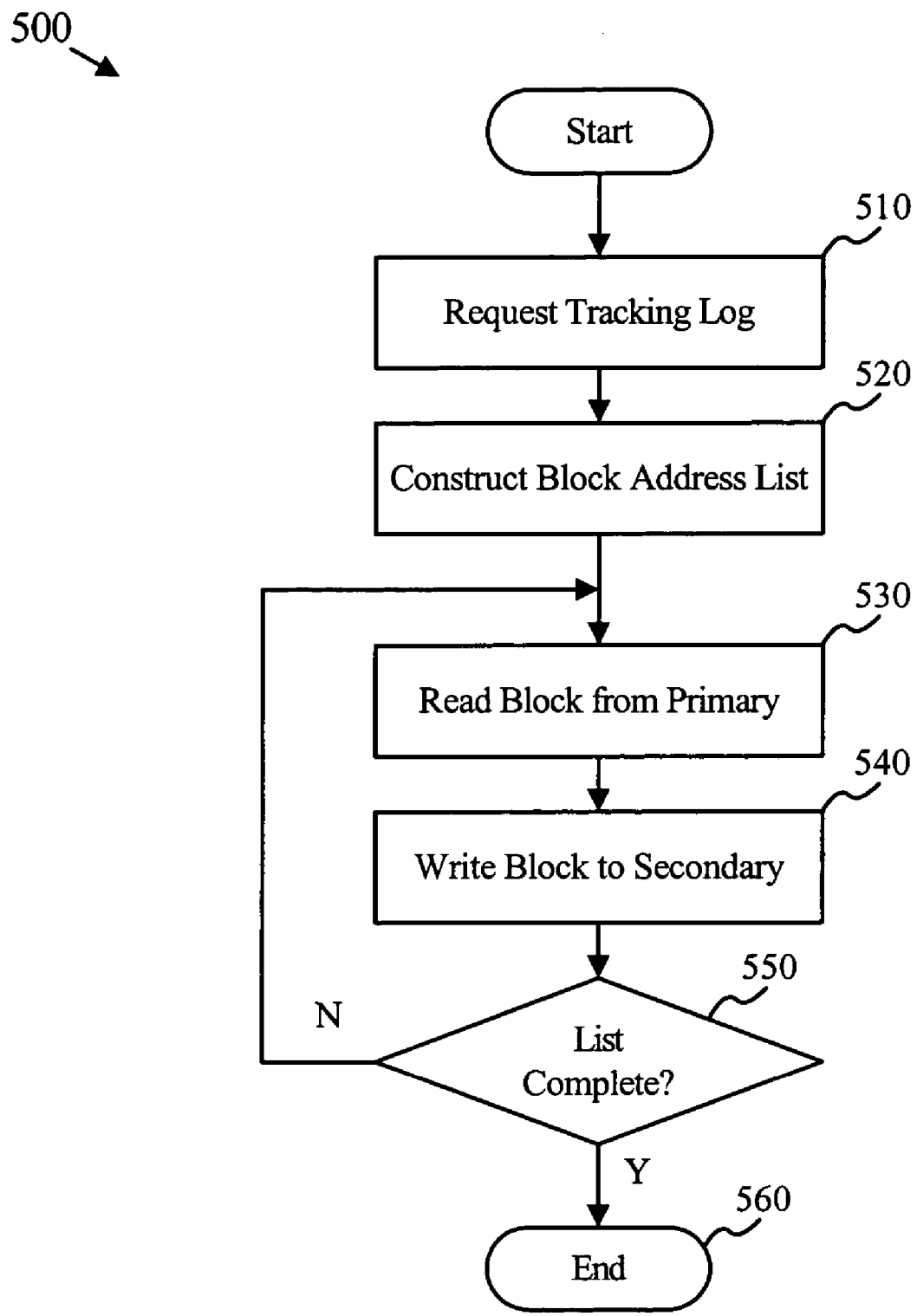
FIG. 5 is a flow chart diagram illustrating one embodiment of a data mirror reconstruction method of the present invention.

FIG. 5 is a flow chart diagram illustrating one embodiment of a data mirror reconstruction method of the present invention. The depicted embodiment of the data mirror reconstruction method 500 includes a request tracking log step 510, a construct block address list 520, a read block from primary storage volume step 530, a write block to secondary storage volume step 540, a list complete test 550, and an end step 560. The data mirror reconstruction method may be conducted by a host CPU such as host CPU 100 of FIG. 1, by a storage controller such as the host controller 140 of FIG. 1, by a backup component such as the backup component 160 of FIG. 1, or by a tracking component such as the tracking component 140 of FIG. 1.

In one embodiment, the data mirror reconstruction method 500 performs the request tracking log step 510 by issuing a read tracking log command to a tracking component, such as the tracking log component 140 of FIG. 1. The tracking log may contain address information relating to all blocks written to all primary storage volumes on the network during a period when a backup component was offline. The construct block address list step 520 extracts block addresses from the log received during the request tracking log step 510 and organizes a block address list.

The data mirror reconstruction method 500 then processes the block address list compiled at step 520 by conducting the read block from primary step 530, which issues a read command to a primary storage volume for an address contained in the block address list. The write block to secondary step 540 issues a write command to a backup component such as the backup component 140 of FIG. 1, using data read from the primary storage volume at step 530.

The list complete test 550 determines if data from all block addresses on the block address list constructed at step 520 have been written to secondary storage. If block addresses remain on the list, control transfers to the read block from primary step 530. If data from all block addresses have been written to secondary storage, control passes to the end step 560.

The present invention facilitates shared data mirroring in a networked system environment by providing devices, methods and systems that increase fault tolerance and enhance performance while simplifying recovery of data mirrors after failure of a backup component. Moreover, the tracking component of the present invention provides a simple, high performance, shared resource that provides virtual congruency between data mirror storage devices in the event of the failure of a backup component.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for logging block address information, the method comprising:
   receiving a tracking command in response to a backup component not being online, wherein the backup component provides a gateway to a secondary volume;
   extracting block address information contained in a tracking command in response to the backup component not being online, wherein the block address information comprises time and date information;
   recording the block address information in a tracking log in response to the backup component not being online;
   transferring the block address information to a location on the network in response to the backup component not being online;
   extracting block addresses from the tracking log;
   organizing a block address list from the extracted block addresses;
   reading blocks of the block address list from a primary volume; and
   writing the memory blocks to the secondary volume when the backup component comes online.

2. The method of claim 1, wherein recording the block address information comprises writing at least one bitmap representing block allocations on the primary volume.

3. A computer readable storage medium embodying one or more instructions stored on a storage device and executable by a processor to perform a method for logging block address information, the method comprising:
   receiving a tracking command in response to a backup component not being online, wherein the backup component provides a gateway to a secondary volume;
   extracting block address information from a tracking command in response to the backup component not being online, wherein the block address information comprises time and date information;
   writing the block address information to a tracking log in response to the backup component not being online;
   transferring the block address information from the tracking log in response to the backup component not being online;
   extracting block addresses from the tracking log;
   organizing a block address list from the extracted block addresses;
   reading blocks of the block address list from a primary volume; and
   writing the memory blocks to the secondary volume when the backup component comes online.

4. The computer readable storage medium of claim 3, wherein the recording of block address information comprises writing at least one bitmap representing block allocations on the primary volume.

\* \* \* \* \*